United States Patent

[11] 3,610,656

| [72] | Inventor | Gerard Timothy Klees<br>Rochester, Mich. |
|---|---|---|
| [21] | Appl. No. | 13,367 |
| [22] | Filed | Feb. 24, 1970 |
| [45] | Patented | Oct. 5, 1971 |
| [73] | Assignee | General Motors Corporation<br>Detroit, Mich. |

[54] SELF-PUMPING HEIGHT CONTROLLER AND DAMPER
5 Claims, 6 Drawing Figs.

[52] U.S. Cl. .................................................... 280/124,
267/60
[51] Int. Cl. ................................................ B60g 11/46
[50] Field of Search .......................................... 280/124 F,
6 H; 267/60

[56] References Cited
UNITED STATES PATENTS
3,195,877 7/1965 Cislo ........................... 267/60

Primary Examiner—Philip Goodman
Attorneys—William S. Pettigrew and John C. Evans ABSTRACT: In preferred form, an integral shock absorber and self-pumping leveling unit for an automobile suspension in which pressurized fluid from the shock absorber's rebound chamber and compression chamber is dampened by flow through a small impulse turbine which operates a small displacement hydraulic fluid pump. A control valve operatively connected to the shock absorber piston rod is operated in response to a predetermined position of the piston rod to direct pressurized fluid from the pump outlet against the piston rod's cross-sectional area when elongation of the leveling unit is desirable for heightening the automobile. The control valve dumps the pressurized fluid into the shock absorber's reservoir chamber in response to a predetermined movement of the piston rod into the shock absorber when contraction of the leveling unit is desirable.

PATENTED OCT 5 1971

3,610,656

INVENTOR.
Gerard J. Klees
BY
J.C. Evans
ATTORNEY

SELF-PUMPING HEIGHT CONTROLLER AND DAMPER

This invention relates to an integral shock absorber and self-pumping leveling unit to supplement the main suspension of an automobile.

When heavy loads are imposed on the spring mass of an automobile, the suspension's main springs are compressed to a smaller height. Excessive contraction of the main spring is undesirable because it may adversely affect the riding quality of the automobile. Excessive loading and resultant spring contraction also may cause the automobile body to assume an undesirably low position with respect to the road.

The subject integral shock absorber and leveling unit is adapted to supplement the normal spring suspension of the vehicle body with relation to the axle whenever the vehicle is subjected to heavy loads. This prevents undesirable lowering of the vehicle body with respect to the road. The unit utilizes an inpulse turbine to convert energy expended in fluid dampening into useful energy in the form of pressurized hydraulic fluid for leveling the vehicle. The pressurized fluid is directed by a control valve against the cross-sectional area of the shock absorber's piston rod to produce an upward force on the vehicle body when supplemental suspension is desirable. More particularly, fluid pressurized in the shock absorber's compression chamber and rebound chamber is passed through a small impulse turbine which drives a small, positive displacement pump to deliver pressurized fluid into a storage chamber. The fluid kinetic energy which is normally dissipated in waste heat is converted by the turbine into useful energy by imparting momentum to the turbine which operates the pump.

The pressurized hydraulic fluid remains in the storage chamber until the control valve directs it against the cross sectional area of the piston rod to produce a lifting force on the vehicle body. This control valve is operably connected to the piston rod to move with it in response to the distance between the vehicle body and the axle.

The use of an impulse turbine is advantageous both for restricting the flow of fluid from the shock absorber to dampen relative movement between a vehicle body and an axle and for converting the fluid's kinetic energy into mechanical energy to produce highly pressurized hydraulic fluid. When the pump rod of a conventional (nonturbine) self-pumper is moved, an undesirable force is imposed on the shock's piston rod to overcome the effect of the pump's outlet pressure on the effective area of the pump. This produces a force on the suspension system analogous to a friction force which adversely affects vehicle ride quality. Self-pumping by an impulse turbine does not induce an added force to the vehicle suspension as the shock's piston rod reciprocates and therefore the ride quality is improved. Normal flow control is maintained through the turbine nozzles even when the turbine is stalled.

An object of the inventor in the present invention is to provide an integral shock absorber and self-pumping leveling unit for a vehicle which utilizes turbine means to convert fluid kinetic energy developed from oscillation of the shock absorber into mechanical energy which operates a pump to pressurize hydraulic fluid used to produce an upward force on the shock absorber piston rod for leveling the vehicle.

A further object of the inventor in the present invention is the provision of an integral shock absorber and self-pumping leveling unit for an automobile which utilizes a turbine having inlets from the shock absorber's rebound and compression chambers to supply pressurized hydraulic fluid through the turbine which drives a pump to pressurize hydraulic fluid used to produce an upward force on the cross-sectional area of the shock absorber piston rod for leveling the automobile.

A still further object of the inventor in the present invention is the provision of an integral shock absorber and self-pumping leveling unit having turbine means for converting fluid kinetic energy into mechanical energy for operating a pump which pressurizes hydraulic fluid for storage within an accumulator chamber until a control valve which is responsive to movement of the shock absorber piston rod directs the pressurized fluid against the cross-sectional area of the piston rod to elongate the unit when leveling of the vehicle is desirable.

Further objects and advantages of the present invention will be apparent from the following description, reference being had to the accompanying drawings wherein a preferred embodiment of the present invention is clearly shown.

IN THE DRAWINGS

FIG. 3 is an end sectional view of the shock absorber and self-leveling unit sectioned along line 3—3 of FIG. 2;

Figure 1:
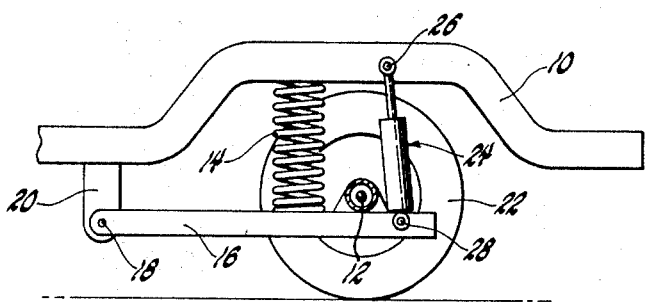
FIG. 1 is a fragmentary view in side elevation of an automobile frame and axle with the self-leveling suspension unit of the present invention.

In FIG. 1 of the drawings, a body-supporting frame 10 of an automobile is shown suspended with respect to axle 12 by a main suspension coil spring 14. Spring 14 extends between the frame 10 and a control arm 16 which is pivotal about a pin 18. Pin 18 is attached to a bracket 20 on frame 10. The axle 12 extends between wheels 22 (only one of which is shown) and is rigidly secured adjacent the wheels to the free ends of the control arms 16 (one of which is shown). An integral shock absorber and self-leveling unit 24 is attached at an upper end 26 to the frame 10 and at a lower end 28 to the control arm 16. The suspension spring 14 and the unit 24 coact to support frame 10 on axle 12.

Figure 2:
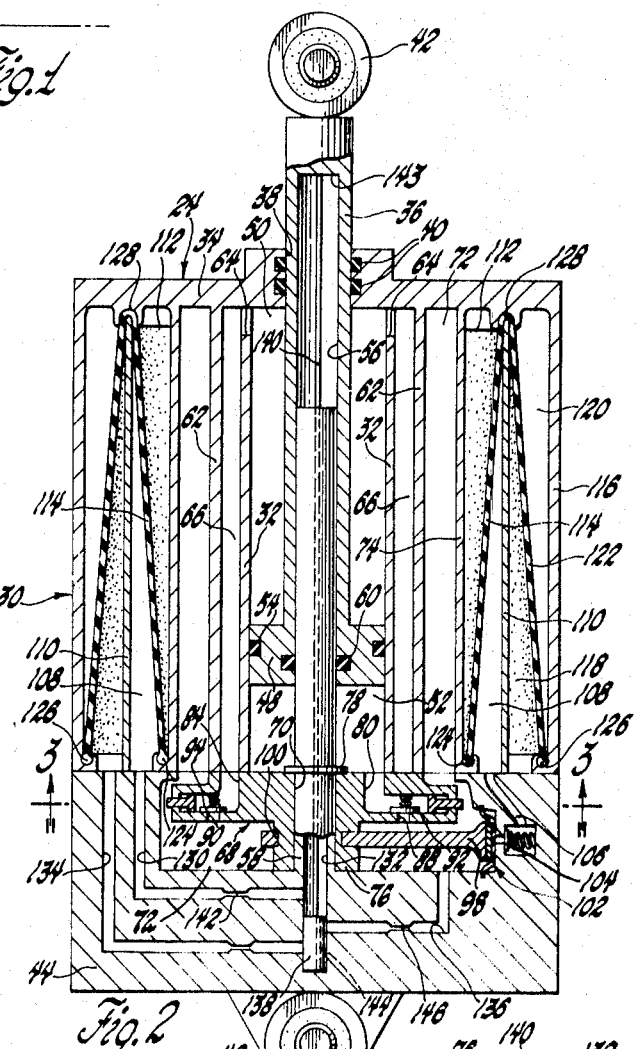
FIG. 2 is a vertical sectioned view of the integral shock absorber and self-leveling unit shown in FIG. 1.

The details of unit 24 are more particularly illustrated in FIG. 2. Unit 24 includes a cylindrical member 30 adapted to be attached to the unsprung mass or axle of the automobile. A pressure cylinder tube 32 is formed in member 30. The upper end of member 30 includes an integral upper end portion 34 having a bore 38 through which a piston rod 36 extends coaxially into the pressure cylinder tube 32. Annular sealing rings 40 in end portion 34 encircle the piston rod 36 to block leakage of hydraulic fluid therebetween. A fitting 42 is adapted to secure the piston rod 36 to frame 10 which supports the sprung mass of the automobile. Fitting 42 is affixed to the upper end of piston rod 36 by suitable fastening means such as welding. The bottom end of member 30 is secured to a lower end portion 44 by suitable fastening means such as welding or brazing. A fitting 46 fastened to the end portion 44 is adapted to attach the shock absorber and self-leveling unit 24 to axle 12 which is the unsprung mass of the automobile.

The lower portion of piston rod 36 is expanded into an enlarged diameter piston 48 within the pressure cylinder tube 32. Piston rod 36 and piston 48 may be formed as separate pieces and attached to one another. The piston 48 divides the pressure cylinder tube 32 into a rebound chamber 50 and a compression chamber 52. An annular sealing ring 54 around the periphery of piston 48 prevents fluid leakage between rebound chamber 50 and compression chamber 52.

Piston rod 36 has a hollow interior formed by a central bore 56. A cylindrical tube 58 extends upwardly from end portion 44 into the bore 56. Piston rod 36 is adapted to reciprocate axially within pressure cylinder tube 32 over and along the tube 58. A sealing ring 60 is supported by piston 48 between tube 58 and bore 56 to block fluid leakage therebetween. A depending cylindrical wall 62 extends from end portion 34 and around pressure cylinder tube 32. A plurality of ports 64 in the upper portion of pressure cylinder tube 32 connects the rebound chamber 50 with an annular passage 66 between wall 62 and pressure cylinder tube 32.

A generally disc-shaped turbine 68 is supported by end portion 44 adjacent the ends of tube 32 and wall 62. Turbine 68 has a central bore 70 through which the cylindrical tube 58 extends. The turbine 68 is free to rotate within a shallow cavity in end portion 44 which is part of a larger reservoir chamber 72. The remainder of reservoir chamber 72 is located in the annular space between cylindrical wall 62 and a larger diameter cylindrical wall 74. Turbine wheel 68 is supported about tube 58 on a reduced diameter portion 76 which bears against end portion 44. A snap ring 78 which encircles the tube 58 retains the turbine wheel 68 against the end portion 44.

As shown in FIGS. 2 and 3, a passage 80 extends from compression chamber 52 through the turbine 68 to a reduced diameter outlet 82 which opens into reservoir chamber 72. Likewise, a passage 84 extends from passage 66 through turbine 68 to a reduced diameter outlet 86 which opens into reservoir chamber 72. A pair of inlets 88 and 90 in the turbine 68 also extend from reservoir chamber 72 to passages 80 and 84 respectively. Spring-biased check valves 92 and 94 block fluid flow through inlets 88 and 90 from the chambers 50, 52 into reservoir chamber 72.

As the piston rod 36 and piston 48 are reciprocated within pressure cylinder tube 32 by relative movement between automobile frame 10 and axle 12, hydraulic fluid within the rebound chamber 50 and the compression chamber 52 is pressurized. The fluid from rebound chamber 50 flows through ports 64, passage 66, passage 84 and outlet 86 into the reservoir chamber 72. The fluid from compression chamber 52 flows through passage 80 and outlet 82 into the reservoir chamber 72. When piston rod 36 moves upward within pressure cylinder 32, makeup fluid is supplied to compression chamber 52 through port 88 and passage 80 past check valve 92. When piston rod 36 moves downward within pressure cylinder tube 32, makeup fluid is supplied to rebound chamber 50 through port 90, passage 84, passage 66 and ports 64.

Rotation of turbine 68 is caused by fluid impact on curved blades 96 which are adjacent the outlets 82 and 86. Blades 96 redirect fluid flow in a tangential direction with respect to the turbine 68. The resultant tangential force rotates turbine 68 about tube 58. One end of a pump arm 98 engages the reduced diameter portion 76 of turbine 68. Arm 98 rests in a variable radius cammed groove 100 formed in the portion 76. When turbine 68 rotates, coaction between arm 98 and cammed groove 100 produces reciprocable movement of the arm 98. Movement of arm 98 operates a small positive displacement pump 102 which draws hydraulic fluid from reservoir chamber 72, pressurizes it and discharges it past a check valve 104, through a passage 106 and into a variable volume storage accumulator chamber 108.

The storage accumulator chamber 108 is between cylindrical wall 74 and a larger diameter cylindrical wall 110 which projects upwardly from end portion 44. The annular space between the walls 74 and 110 is diagonally divided into a gas chamber 112 and the storage accumulator chamber 108 by an elastic separator wall 114. Wall 114 stretches to accommodate increased pressure within the storage accumulator chamber 108. Likewise, the annular space between wall 110 and an outer cylindrical wall 116 is diagonally divided into an active accumulator chamber 118 and a gas chamber 120 by an elastic separator wall 122. In the preferred embodiment shown in FIG. 2, separator walls 114 and 122 are composed of a single piece of elastic material having one edge attached to the lower part of wall 74 at 124 and the other edge attached to the lower part of wall 116 at 126. The wall 110 projects upwardly from portion 44 to bias the midportion of the elastic separator against end portion 34 at 128. A suitable gas for chambers 112 and 120 is nitrogen.

The storage accumulator chamber 108 is fluidly connected to the interior of piston rod 36 by a passage 130 in end portion 44 and the central bore 132 through tube 58. The active accumulator chamber 118 is fluidly connected to the interior of piston rod 36 through a passage 134 and the bore 132. Still another passage 136 in end member 44 fluidly connects the reservoir chamber 72 with the bore 132 in tube 58. A control valve 138 is supported for reciprocation within the bore 132. Control valve 138 is attached to the piston rod 36 by a thin connecting member 140 which moves the control valve 138 within the bore 132 in response to reciprocation of the piston rod 36 in pressure cylinder tube 32.

In FIG. 2, control valve 138 is illustrated in a position corresponding to undesirably small spacing between the frame 10 and axle 12 caused by a heavy loading of the automobile. In this control position, pressurized fluid from the storage accumulator chamber 108 passes through passage 130, a restrictive orifice 142, bore 132 and into the interior of the piston rod 36 where a fluid pressure force is exerted against the cross-sectional end area 143 of piston rod 36. This pressure force supplements the main suspension springs 14 and increases the spacing between frame 10 and axle 12.

Figure 4:
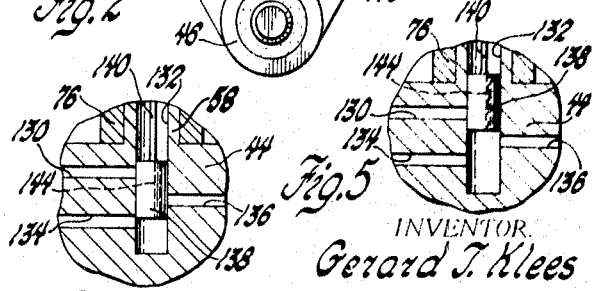
FIG. 4 is a fragmentary sectional view of the lower portion of the unit shown in FIG. 2.

The position of control valve 138 illustrated in FIG. 4 corresponds to a neutral position of the unit 24 which occurs when frame 10 and axle 12 are spaced a predetermined desirable distance. In this control position, control valve 138 blocks passage 130 to prevent the flow of additional pressurized fluid into the interior of piston rod 36 from the storage accumulator chamber 108. Passage 136 remains blocked to prevent the flow of fluid into reservoir chamber 72.

An axial bleed port 144 through the control valve 138 communicates the active accumulator chamber and passage 134 with the interior of the piston rod 36. This accommodates for pressure fluctuations within the piston rod interior caused by reciprocation of the piston rod within pressure cylinder tube 32.

Figure 5:
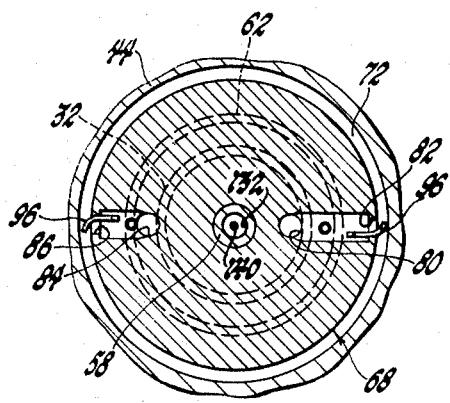
FIG. 5 is a fragmentary sectional view similar to FIG. 4.

The position of control valve 138 illustrated in FIG. 5 corresponds to an undesirably large spacing between the frame 10 and axle 12 and an overly expanded unit 24. In this control position, control valve 138 blocks the passage 130 from the storage accumulator chamber 108 and unblocks passage 136 to the reservoir chamber 72. Consequently, pressurized fluid from the interior of piston rod 36 and the active accumulator chamber 118 may flow through passage 136, past an orifice 146 and into the reservoir chamber 72. This reduces the pressure within the interior of piston rod 36 and decreases the force against area 143 of bore 56 to contract the unit 24.

Figure 6:
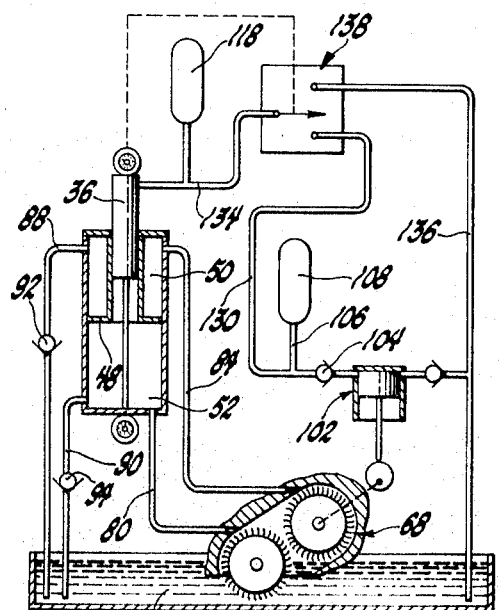
FIG. 6 is a schematic view of the shock absorber and self-leveling unit shown in FIG. 2.

In FIG. 6 a schematic illustration of the shock absorber and self-leveling unit 24 is illustrated. During normal dampening of relative movement between frame 10 and axle 12, pressurized hydraulic fluid alternately flows through passages 80 and 84 from the compression chamber 52 and rebound chamber 50 respectively. The pressurized fluid coacts with turbine blades 96 and subsequently passes into the reservoir chamber 72. Turbine means 68 are schematically shown in FIG. 6 as dual innerconnected pelton turbines. In an actual embodiment of the shock absorber and self-leveling unit 24, any impulse type turbine may be used including the pelton turbine or a turbine with tangential discharge as shown in FIG. 2.

Rotation of the turbine 68 operates a hydraulic pump 102 which draws fluid from the reservoir chamber 72 and discharges it into a storage accumulator chamber 108. Pressurized hydraulic fluid is directed from chamber 108 through a passage 130 and a control valve assembly 138. The control valve assembly 138 schematically shown in FIG. 6 is responsive to the position of piston rod 36 within the pressure cylinder tube 32. The resultant fluid valving and fluid forces produces desirable spacing between frame 10 and axle 12 of the automobile. More particularly, when the unit 24 is contracted, control valve 138 directs pressurized fluid from chamber 108 and passage 130 into the active accumulator chamber 118 and into the interior of the piston rod 36. When the unit 24 is excessively extended, control valve 138 passes hydraulic fluid from the active accumulator chamber 118 and from the interior of piston rod 36 into the reservoir chamber 72 through a passage 136. After initial spacing of the frame 10 and axle 12, a neutral position of control valve 138 is achieved which blocks both passage 130 from the storage accumulator chamber 108 and passage 136 to the reservoir chamber 72. The active accumulator chamber 118 accommodates the ingress and egress of fluid in the interior of piston rod 36 caused by its reciprocation over tube 58. In this position, pressurized fluid within the interior of piston rod 36 presses against the interior end area of the piston rod to maintain the unit 24 in a desirable extended position.

While the embodiment of the present invention as herein described constitutes a preferred form, it is to be understood that other forms may be adapted.

What is claimed is as follows:

1. An integral shock absorber and self-pumping leveling unit for an automobile comprising: a member adapted to be attached to the unsprung mass of the automobile; said member having a hydraulic fluid filled pressure cylinder tube within its interior; a piston rod adapted to be attached at its one end to the sprung mass of the automobile; said piston rod extending through said member coaxially into said pressure cylinder tube; a piston on another end of said piston rod for reciprocation within said pressure cylinder tube to dampen movement between said sprung and unsprung masses; said piston dividing said pressure cylinder tube into a fluid filled rebound chamber and a fluid filled compression chamber; a fluid reservoir chamber encircling said pressure cylinder tube; turbine means within said member for converting fluid kinetic energy into rotational energy; said turbine means having inlets fluidly connected to said rebound chamber and said compression chamber and an outlet fluidly connected to said reservoir chamber to provide an open fluid passage between said rebound and compression chambers and said reservoir chamber for dampening fluid flow through said turbine means and whereby normal fluid damping through said turbine means is unaffected by rotation or nonrotation of said turbine means; means for pumping hydraulic fluid having an inlet fluidly connected to said reservoir chamber; pressure accumulator means connected to an outlet of said pump means for storing pressurized fluid; means between said turbine means and said pump means for operating said pump means in response to rotation of said turbine means; a control valve responsive to movement of said piston rod downward from a predetermined position within said pressure cylinder tube for directing pressurized fluid from said pressure accumulator means against the cross sectional end area of said piston rod to produce a force thereon which moves the piston rod outward from the unit and increases the spacing between said sprung and unsprung masses of the automobile; said control valve directing pressurized fluid from said end area of said piston rod to said reservoir chamber upon upward movement of said piston rod from the predetermined position to reduce the force thereon which causes said piston rod to move into the unit and decreases the spacing between said sprung and unsprung masses.

2. An integral shock absorber and self-pumping leveling unit for an automobile comprising: a member adapted to be attached to the unsprung mass of the automobile; said member having a hydraulic fluid filled pressure cylinder tube within its interior; a piston rod adapted to be attached at one end to the sprung mass of the automobile; said piston rod extending through said member coaxially into said pressure cylinder tube; a piston on another end of said piston rod for reciprocation within said pressure cylinder tube to dampen movement between said sprung and unsprung masses; said piston dividing said pressure cylinder tube into a fluid filled rebound chamber and a fluid filled compression chamber; a cylindrical wall encircling said pressure cylinder tube and fluidly connected to said rebound chamber forming an annular passage; a fluid reservoir chamber encircling said cylindrical wall and said pressure cylinder tube; a tube extending from a lower end portion of said member into an axial bore within said piston rod; a generally disc shaped turbine rotatable about said tube for converting fluid kinetic energy into rotational energy; said turbine being supported between said lower end portion and the ends of said cylindrical wall and said pressure cylinder tube; inlets in the turbine fluidly connected to said rebound chamber through said annular passage and to said compression chamber; radially directed outlets in said turbine leading to said reservoir chamber; said turbine inlets and said turbine outlets providing an open fluid passage between said rebound and compression chambers and said reservoir chamber for dampening fluid flow through said turbine and whereby normal fluid dampening through said turbine is unaffected by rotation or nonrotation of said turbine; means adjacent said outlets for redirecting fluid flow from said outlets into a tangential direction to impart a tangential force on said turbine; means for pumping hydraulic fluid having an inlet fluidly connected to said reservoir chamber; pressure accumulator means connected to an outlet of said pump means for storing pressurized fluid; means between said turbine and said pump means for operating said pump means in response to rotation of said turbine; a control valve responsive to movement of said piston rod downward from a predetermined position within said pressure cylinder tube for directing pressurized fluid from said pressure accumulator means through said tube and into said axial bore in said piston rod against the cross-sectional end area of said piston rod to produce a force thereon which moves the piston rod outward from the unit and increases the spacing between said sprung and unsprung masses of the automobile; said control valve directing pressurized fluid from said end area of said piston rod to said reservoir chamber upon upward movement of said piston rod from the predetermined position to reduce the force thereon which causes said piston rod to move into the unit and decreases the spacing between said sprung and unsprung masses.

3. The integral shock absorber and self-pumping leveling unit as set out in claim 2 wherein, said flow-redirecting means are curved blades affixed to said turbine which extend in a radial direction adjacent said outlets and are curved into a tangential direction with increased radial distance from said outlets.

4. The integral shock absorber and self-pumping leveling unit as set forth in claim 2 wherein, said pressure storage accumulator means includes at least one elastic separator wall for accommodating pressure fluctuations therein.

5. The integral shock absorber and self-pumping leveling unit as set forth in claim 2 wherein, said pump-operating means includes a cammed groove in said turbine; one end of an arm engaging said cammed groove to produce lineal reciprocation of said arm which drives said pump means connected to the other end.